United States Patent
Takeshima et al.

[11] Patent Number: 5,840,444
[45] Date of Patent: Nov. 24, 1998

[54] ELECTRODE FOR STORAGE BATTERY AND PROCESS FOR PRODUCING THE SAME

[75] Inventors: Hiroki Takeshima, Fujisawa; Yohei Hattori, Moriguchi; Katsuhiro Okamoto, Toyohashi; Masato Tsuji, Kyoto; Takeo Takayanagi, Nara, all of Japan

[73] Assignee: Matsushita Electric Industrial Co., Ltd., Osaka, Japan

[21] Appl. No.: 742,186

[22] Filed: Oct. 30, 1996

Related U.S. Application Data

[63] Continuation-in-part of Ser. No. 587,354, Jan. 16, 1996, abandoned.

[30] Foreign Application Priority Data

| Jan. 18, 1995 | [JP] | Japan | 7-005687 |
| Mar. 2, 1995 | [JP] | Japan | 7-042903 |
| Dec. 28, 1995 | [JP] | Japan | 7-342786 |

[51] Int. Cl.⁶ .................. H01M 4/24; H01M 4/26
[52] U.S. Cl. .............. 429/223; 429/235; 429/245; 29/623.5
[58] Field of Search .................. 429/223, 221, 429/209, 235, 243, 244, 245; 419/2, 5, 6, 4, 24, 64, 65; 428/550, 566, 613; 427/428, 437; 264/44, 56, 29.1; 141/1.1, 32

[56] References Cited

U.S. PATENT DOCUMENTS

| 2,627,531 | 2/1953 | Vogt | 429/223 X |
| 2,977,401 | 3/1961 | Marsal et al. | 429/223 X |
| 4,215,190 | 7/1980 | Ferrando et al. | 429/222 |
| 4,330,603 | 5/1982 | Jackowitz et al. | 429/206 |
| 4,623,600 | 11/1986 | Fritts et al. | 429/223 |
| 4,729,871 | 3/1988 | Morimoto . | |
| 4,940,553 | 7/1990 | von Benda et al. | 252/182.1 |
| 5,196,281 | 3/1993 | Pensabene et al. | 429/209 |
| 5,264,309 | 11/1993 | Bronoel et al. | 429/222 |
| 5,487,961 | 1/1996 | Strangways et al. | 429/223 |

FOREIGN PATENT DOCUMENTS

| 0581275A2 | 2/1994 | European Pat. Off. . |
| 3739735A1 | 6/1989 | Germany . |
| 61-293618 | 12/1986 | Japan . |

OTHER PUBLICATIONS

Chemical Abstracts, vol. 118, No. 12, 22 Mar. 1993, Columbus, Ohio, US; abstract No. 106359 & JP-A-04 345 756 (Shin-Kobe Electric Machinery Co.) 1 Dec. 1992.
Chemical Abstracts, vol. 118, No. 20, 17 May 1993, Columbus, Ohio, US; abstract No. 195189 & JP-A-04 349 355 (Shin-Kobe Electric Machinery Co.) 1 Dec. 1992.
Patent Abstracts of Japan, vol. 012, No. 239 (E-630), 7 Jul. 1988 & JP-A-63 029450 (Sanyo Electric Co Ltd) 8 Feb. 1988.
Patent Abstracts of Japan, vol. 013, No. 268 (E-775), 20 Jun. 1989 & JP-A-01 059766 (Hitachi Chemical Co Ltd) 7 Mar. 1989.
Chemical Abstracts, vol. 116, No. 8, 24 Feb. 1992, Columbus, Ohio, US; abstract No. 63498 & JP-A-03 201 367 (Toshiba Battery Co.) 3 Sep. 1991.
Patent Abstracts of Japan, vol. 012, No. 204 (E-620), 11 Jun. 1988 & JP-A-63 004561 (Toshiba Battery Co Ltd) 9 Jan. 1988.

*Primary Examiner*—Anthony Skapars
*Attorney, Agent, or Firm*—Stevens, Davis, Miller & Mosher, L.L.P.

[57] ABSTRACT

The present invention provides an electrode for batteries, especially a pasted electrode, and a process for producing the same which is improved in the adhesiveness between the active material and the electrode core material, utilization of the active material, discharge characteristics and in the charge and discharge cycling life. The resultant electroconductive core material comprises a perforated or non-perforated metal sheet such as punched metal sheet having sintered hollow nickel members separately or entangled fixed on the surfaces thereof. The hollow of the sintered nickel members is formed due to the thermal decomposition and evaporation of the resin fibers which have been applied to the electroconductive core material.

44 Claims, 2 Drawing Sheets

ELECTRODE FOR STORAGE BATTERY AND PROCESS FOR PRODUCING THE SAME

This application is a continuation-in-part of application Ser. No. 08/587,354, filed Jan. 16, 1996 (abandoned) incorporated herein by reference.

BACKGROUND OF THE INVENTION

1. Field of the Invention

The present invention relates to an electrode for use in storage batteries, particularly a pasted electrode and a process for producing the same.

2. Description of Prior Art

There have widely been used lead acid batteries, alkaline batteries and recently lithium batteries as power supplies for various electronic apparatuses. Of these batteries those of a smaller size have been used as power supplies in compact electronic apparatuses, while those of a larger size have been used in industrial facilities. Electrodes used in these batteries include lead oxide and lead electrodes for lead acid batteries; positive nickel electrodes and negative cadmium or hydrogen absorbing alloy electrodes for alkaline batteries; and lithium electrodes, metal oxide electrodes and graphite electrodes for lithium storage batteries.

These electrodes have been produced by various techniques such as a process comprising applying a paste prepared by kneading nickel particles to an electrode core substrate, sintering the paste-applied substrate. and then impregnating the resulting substrate with an active material, and a process comprising providing an electroconductive porous body such as a three dimensional stricture of foamed metal or a hookless two dimensional structure of punched metal and pasting a paste directly into the electroconductive porous body. This process using pasting is most advantageously capable of producing electrodes at lower cost due to easy production as compared with the process using sintering.

JP-A-61-293618 discloses an electrode produced by implanting fibrous nickel on a stainless steel screen, rolling the implanted screen, and sintering the rolled screen. It prevents the sintered nickel electrode from cracking as well as solves a specific problem of difficulties in controlling a thickness of electrode as experienced with the sintered electrodes.

The pastes to be used in the pasted electrodes as described above are generally made of an active material and other materials such as sulfuric acid and water without any binders in the case of lead acid batteries, or with binders in the case of the alkaline battery or other type batteries such as polyvinyl alcohol, carboxymethylcelluloses, polyethylenes, polyvinyl chlorides, styrene-butadiene based rubbers, fluorinated resins or the like. Core materials to be used in such electrodes include electroconductive porous members such as a two-dimensional structure of expanded metal, screen, punched metal and a three dimensional structure of foamed metal and the like.

Among these electroconductive porous members, the two-dimensional structure of punched metal and the like is characterized by being capable of allowing a large current to transmit as well as rendering the production cost lower. Disadvantageously, however, the two-dimensional structure of electroconductive porous metal produces a very serious problem of improving the electroconductivity when it is used as a core material for the pasted electrodes. That is, the use of the two-dimensional structure of punched metal rather than the three dimensional structure of foamed metal may cause an insufficient contact between the active material and the core material resulting in an increased internal resistance. In order to improve the electroconductivity, an attempt has been made to mix additives such as powdery or fibrous graphite or nickel into the paste. However, the resulting electrodes are inferior in utilization of active material, discharge voltage characteristics and in charge-discharge cycling life to the electrodes which are produced with the three dimensional structure of sintered or foamed metal, which has resulted in allowing the electrodes of the two-dimensional structure such as that of punched metal to be used only in a limited application.

In addition, when the core materials used are of the two-dimensional structure, it can not prevent the active material such as nickel hydroxide at a nickel electrode, which has inherently a crystal structure to swell at both charging and discharging time, from swelling without any core material encasing the active material being provided as in the three dimensional structure. In sealed cells or batteries, the amount of an electrolyte therein is restricted because of absorption of gas. Under such conditions, repetition of charging and discharging cycles may cause excess absorption of the electrolyte to proceed over an acceptable level, resulting in a deficiency of electrolyte which causes a reduction in discharge voltage as well as discharge capacity. These problems still remain to be solved.

SUMMARY OF THE INVENTION

An object of the present invention is to provide a pasted electrode which is improved in adhesiveness with an active material, utilization of active material, discharge voltage characteristics and in the number of charging and discharging cycles to overcome the problems as described above.

In order to achieve the aforementioned object, the present invention provides an electrode for use in batteries which comprises an electroconductive core material made of a perforated or non-perforated metal sheet or foil filled or coated with a paste containing an active material, said electroconductive core material having on its surface a unitary sintered fibrous nickel material.

In this case the sintered fibrous nickel material has preferably an amount of metal per unit area by weight of 300 to 800 g/m². The sintered fibrous nickel material is preferably of a hollow structure.

Another object of the present invention is to provide a process for producing the aforementioned electrode comprising steps of implanting a resin fibers on the electroconductive core material with an adhesive, pasting a paste produced by kneading nickel particles with a binder onto the fiber-implanted electroconductive core material, drying the resulting composite, calcining the dried composite to thermally decompose out said resin fibers, adhesive and binders and sintering the nickel particles at the interfaces therebetween and the electroconductive core material and the nickel particles at the interfaces therebetween.

Still another object of the present invention is to provide a process for producing the aforementioned electrode comprising steps of coating an adhesive on the electroconductive core material, implanting resin fibers on the coated electroconductive core material, forming a nickel layer on the surfaces of the electroconductive core material and the resin fibers, thermally decomposing out said resin fibers and said adhesive, and sintering the nickel layer as well as the electroconductive core material and the nickel layer at the interfaces therebetween. The step of forming a nickel layer on the surfaces of the electroconductive core material and the resin fibers may be practically achieved by heating the core material and the resin fibers in an atmosphere of nickel carbonyl gas at a temperature not lower than the decomposition temperature thereof, or cathode sputtering in vacuum, or evaporating nickel in vacuum onto the surfaces of the electroconductive core material and the resin fibers, or ion-plating, or chemically plating, followed by sintering.

DETAILED DESCRIPTION OF PREFERRED EMBODIMENTS

Figure 1:
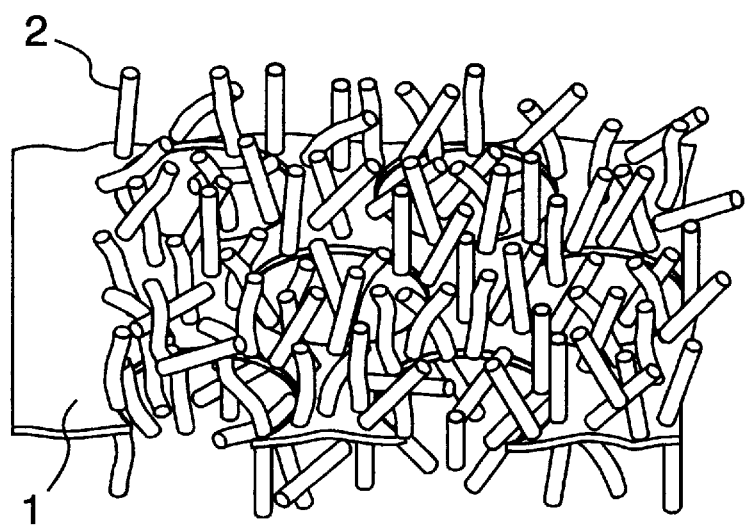
FIG. 1 is an enlarged perspective view of the substrate a in Example.

Term "sintering" used herein means generally that particles are partially fused to be bonded, but it may refer to any heat-treatment of a layer produced by chemical or physical plating at temperatures, at which the layer are partially fused.

According to the present invention there is produced a substrate comprising a two-dimensional structure of core material, such as punched metal, having on its surface a number of projected nickel fibers sintered. The number of nickel fibers integrated with the core material have interstices which can three-dimensionally retain an active material and serve as electroconductive network to suppress the swelling of the active material resulting in a higher utilization and an increased voltage of the battery. Moreover, in case the sintered nickel fibers are of a cylindrical shape having a large pore therein, the interior of the pore can be filled with the active material to further improve the contact between the active material and the core material.

In a battery arranged with this type of electrode, an electrolyte is retained also in the voids of the sintered nickel fibers as well as in a separator. The electrolyte retained in the voids may be supplied through the pores to electrolyte-depleted portions in the nickel electrode as charging and discharging are repeated. This suppresses the phenomenon that the performance of the battery is reduced when the nickel electrode absorbs an excess amount of electrolyte from the separator, thereby greatly contributing to an elongated life of the battery.

The sintering of interfaces between the nickel fibers and those between the core material and the nickel fibers may be performed by passing them near a high frequency coil unit or by moving the high frequency coil unit to heat them more uniformly and more effectively than a radiation heating method, which can enhance the productivity.

The nickel fibers, before sintering, may be oriented in an alternating magnetic field and then subjected to magnetization treatment so that the nickel fibers are arranged densely and parallel to one another on the surfaces of the core material, and thereafter sintered to prevent the nickel fibers from releasing from the sintered body as well as to improve the strength of the sintered body.

EXAMPLES

A nickel-plated iron punched metal of 0.06 mm in thickness, a pore size of 2 mm and a rate of hole area of 52% was coated on both sides thereof with a phenolic adhesive (20% solids) by spraying. Onto both the coated sides of the punched metal which was grounded, a pile of rayon fibers cut in a diameter of 15 $\mu$m and a length of 4 mm was in portions dropped from a vibrating screen through a charging hood where the fibers were positively charged to implant the fibers on the punched metal. The implanted punched metal was dried to fix the fibers onto the metal sheet which was brushed with a rolling brush while aspirating by an exhaust fan to remove free fibers from the sheet to produce a sheet implanted with fibers in a density of 15 grams fibers/m$^2$. The application of the adhesive may be similarly achieved by a roller transferring method. 300 parts by weight of nickel carbonyl particles having an apparent particle density of 1.2 grams/cc, 50 parts by weight of a phenolic adhesive (20 % solids) and 60 parts by weight of an aqueous 3 wt. % CMC solution were kneaded and stirred with a high speed rolling mixer to produce a nickel paste which was coated by spraying onto both sides of the fiber-implanted sheet to a total density of applied nickel of 300 grams/M$^2$. The sheet was passed near a solenoid coil through which an alternating current of 10 Hz was allowed to flow, and then through a magnetic field of about 0.1 T (tesla) generated with a DC current solenoid coil, prior to drying. After drying, the sheet was passed near a high frequency coil with a high frequency power supply of 5 KW and 1,000 KHz while controlling the output to achieve a surface temperature of the sheet of 600° C., thereby thermally decomposing out the fibers and the adhesive in the fiber-implanted sheet. Then, the sheet was passed through a high frequency coil with a high frequency power supply of 10 KW and 1,000 KHz in an atmosphere of a mixture of hydrogen and nitrogen while controlling the output so as to maintain a surface temperature of the sheet at 1,000° C., thereby sintering the nickel particles at the interfaces therebetween and the core material and the nickel particles at the interfaces therebetween to produce a substrate a according to an embodiment of the present invention. This substrate had an amount of metal per unit area by weight of 700 grams/m$^2$.

When the nickel paste pasted sheet was passed near the solenoid coil powered by an alternating current of 3 to 20 Hz prior to drying, the nickel particles deposited on the implanted fibers was vibrated up and down and right and left depending upon the frequency of the alternating current, so that the fibers were arranged uniformly and densely around the surfaces of the frame network of core material. Moreover, when the sheet was passed through the magnetic field of about 0.1 T (tesla) generated with the DC current solenoid coil, the nickel particles on the surfaces of the fiber implanted sheet were magnetized to allow the nickel particles to bond magnetically to one another, so that the nickel particles were prevented from releasing from the sheet. Although the intensity of the magnetic field may be selected at an optimum value depending upon the configuration of the nickel carbonyl particles, the magnetization of the nickel particles under a magnetic field on the order of about 0.1 T is possible to improve the tightness between the particles.

The high frequency method for sintering the nickel particles owing to self-heat generation permits a great reduction in period of sintering time because the nickel particles simultaneously generate heat in the high frequency coil and undergo more uniformly and more promptly sintering as compared with the conventional infrared radiation heating method. In addition, the sintering furnace is required to be only as long as the length of the high frequency coil so that it can be made very small.

FIG. 1 is a perspective view of the substrate a of prepared in the example where punched metal 1 has hollow nickel members 2, most of which are separately or entangled fixed thereon. The rayon fibers were thermally decomposed out leaving the hollow nickel members. The fibers were so thin that the active material can be retained in the interstices of the hollow nickel members.

In further modified embodiment of the present invention, a nickel foil of 0.03 mm in thickness was coated on both sides thereof with a phenolic adhesive (20% solids) by spraying similarly to the substrate a as described above. Onto both the coated sides of the nickel foil which was grounded, a pile of rayon fibers cut in a diameter of 150 $\mu$m and a length of 3 mm was in portions dropped from a vibrating screen while positively charging through a charging hood to implant the fibers on the nickel foil. The fiber implanted foil was dried to fix the fibers on the foil which was brushed with a rolling brush while aspirating by an exhaust fun to remove free fibers from the foil to produce a sheet implanted with fibers in a density of 15 grams fibers/$m^2$. The sheet was provided with a fiber-free portion, onto which a lead wire or collector can be spot welded. The sheet was further processed in the same manner as in the case of the aforementioned substrate a to produce a substrate b. This substrate b had sintered nickel members in an amount of nickel metal per unit area by weight of 500 grams/$m^2$.

Figure 2:
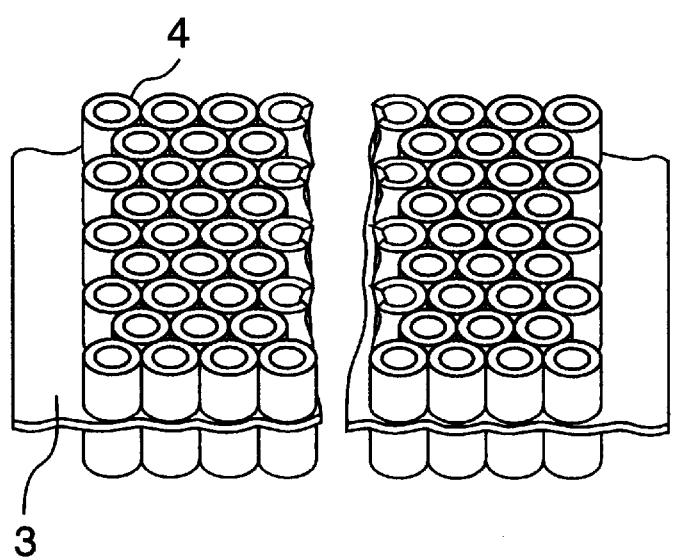
FIG. 2 is an enlarged perspective view of the substrate b of Example.

FIG. 2 is a perspective view of the substrate b of an embodiment of the present invention where nickel hollow members 4 are independently fixed on nickel foil 3. The rayon fibers were thermally decomposed out leaving the hollow nickel members. These fibers were rather thick so that the active material would be retained in the hollow voids and the interstices of the cylindrical hollow nickel members. Alternatively, 300 parts by weight of nickel carbonyl particles having an apparent particle density of 1.2 grams/cc, 50 parts by weight of a phenolic adhesive (20 % solids) and 60 parts by weight of an aqueous 3 wt. % CMC solution were kneaded and stirred with a high speed rolling mixer to produce a nickel paste which was then coated by spraying onto rayon fibers having a diameter of 150 $\mu$m. The coated fibers were passed near a solenoid coil through which an alternating current of 10 Hz was allowed to flow, and then through a magnetic field of about 0.1 T (tesla) generated with a DC current solenoid coil, prior to drying. After drying, the nickel coated fibers were cut to produce a pile of cut fibers. A nickel-plated iron punched metal sheet of 0.06 mm in thickness, a pore size of 2 mm and a rate of hole area of 52% was coated on both sides thereof with a phenolic adhesive (20% solids) by spraying. The pile of the cut nickel coated fibers was implanted onto both the adhesive coated sides of the punched metal sheet to produce a nickel-coated fiber implanted sheet. The sheet was passed near a high frequency coil with a high frequency power supply of 5 KW and 1,000 KHz while controlling the output to achieve a surface temperature of the sheet of 600 ° C., thereby thermally decomposing out the fibers and the adhesive in the fiber-implanted sheet. Then the sheet was passed near a high frequency coil with a high frequency power supply of 10 KW and 1,000 KHz in an atmosphere of a mixture of hydrogen and nitrogen while controlling the output so as to achieve a surface temperature of the sheet of 1,000° C., thereby sintering the nickel particles at the interfaces therebetween and the core material and the nickel particles at the interfaces therebetween to produce a substrate c according to an embodiment of the present invention. This substrate had sintered nickel members in an amount of nickel metal per unit area by weight of 400 grams/$m^2$.

In a still further modified embodiment of the present invention, an iron punched metal sheet of 0.06 mm in thickness, a pore size of 2 mm and a rate of hole area of 52 % was used and processed in the same manner as in the case of the substrate a as described above to produce a fiber-implanted sheet. Thereafter, the sheet was nickel-plated by placing the sheet in an autoclave filled with a carbon monoxide gas containing 50% by volume of a nickel carbonyl gas maintained at 20° C. The autoclave was equipped with an infrared transparent window, through which an external infrared source irradiated the sheet therein without heating the sheet up to a nickel carbonyl decomposition temperature allowing the nickel carbonyl to be deposited uniformly on the fiber-imimplanted sheet. The exhaust gas from the autoclave was collected and frozen at −80° C. with dry ice, and thereafter decomposed at 280° C., followed by burning with a burner to completely remove the nickel carbonyl. Then, the nickel plated fiber-implanted sheet was passed near a high frequency coil with a high frequency power supply of 5 KW and 1,000 KHz while controlling the output to achieve a surface temperature of the sheet of 600° C. thereby thermally decomposing out the fibers and the adhesive in the fiber-implanted sheet. Moreover, the sheet was passed near a high frequency coil with a high frequency power supply of 10 KW and 1,000 KHz in an atmosphere of a mixture of hydrogen and nitrogen while controlling the output so as to achieve a surface temperature of the sheet of 1,000° C., thereby sintering the nickel layer as well as the core material and the nickel layer at the interfaces therebetween. This substrate had sintered nickel members in an amount of nickel metal per unit area by weight of 600 grams/$m^2$. This substrate is referred to as d.

In still further modified embodiments of the present invention, a nickel-plated iron punched metal of a thickness of 0.06 mm, a pore size of 2 mm and a rate of hole area of 52% was coated on both sides thereof with a phenolic adhesive (20% solids) by spraying. Onto both the coated sides of the punched metal which was grounded, a pile of rayon fibers cut in a diameter of 15 $\mu$m and a length of 4 mm was in portions dropped from a vibrating screen through a charging hood where the fibers were positively charged to implant the fibers on the punched metal. The implanted punched metal was dried to fix the fibers onto the metal sheet which was brushed with a rolling brush while aspirating by an exhaust fun to remove free fibers from the sheet to produce a sheet implanted with fibers in a density of 15 grams fibers/$m^2$. The fiber-implanted sheet was coated with nickel to a thickness of about 0.05 $\mu$m to 0.1 $\mu$m by means of conventional vapor deposition, ion-plating, and sputtering techniques, and thereafter controlled by electrochemical deposition to achieve an amount of nickel metal per unit area by weight of 400 grams/$m^2$. Then, the nickel plated fiber-implanted sheet was passed near a high frequency coil with a high frequency power supply of 5 KW and 1,000 KHz while controlling the output to achieve a surface temperature of the sheet of 600° C., thereby thermally decomposing out the fibers and the adhesive in the fiber-implanted sheet. Then, the sheet was passed near a high frequency coil with a high frequency power supply of 10 KW and 1,000 KHz in an atmosphere of a mixture of hydrogen and nitrogen while controlling the output so as to maintain a surface temperature of the sheet at 1,000° C., thereby sintering the nickel layer as well as the core material and the nickel layer at the interfaces therebetween. The substrate produced by the vapor deposition technique is referred to as a substrate e, one by the ion-plating technique a substrate f, and one by the sputtering technique a substrate g.

In a still further modified embodiment of the present invention, an iron punched metal of a thickness of 0.06 mm, a pore size of 2 mm and a rate of hole area of 52% was coated on both sides thereof with a phenolic adhesive by spraying and processed in the same manner as in the case of the substrate a. The fiber-implanted sheet was electrolessly plated with an electroconductive nickel layer at 30 grams nickel/m$^2$ on the surfaces thereof by immersing the sheet in an electroless plating bath warmed at 35° C. containing primarily sodium hypochlorite, nickel sulfate and sodium citrate for 5 minutes. After washing with water, the electrolessly plated fiber-implanted sheet was immersed in a Watt bath warmed at 50° C. and electrolyzed at a current density of 5 A/dm$^2$ for 45 minutes to form further a nickel layer plated in an amount of nickel metal per unit area of 400 grams/m$^2$. The nickel electroplated fiber-implanted sheet was sintered in an atmosphere of mixture of hydrogen and nitrogen, after the resin component was decomposed out in the same manner as in the case of the substrate d. This substrate had sintered nickel members in an amount of nickel metal per unit area by weight of 500 grams/m$^2$.

Although rayon fibers were used for resin fibers in the above Examples, urethanes, cotton and the like may be employed so far as they can be decomposed without melting. Similarly though the resin fibers were of mono-filament (cylindrical shape), twist yarn (spirally twisted structure) may be used. The nickel plated or non-plated iron punched metal sheet used in the above examples as electroconductive core materials may be replaced by non-perforated sheets, wire network sheets, lath metal and the like.

The substrates a to h were used to prepare batteries which were evaluated for characteristics.

Figure 3:
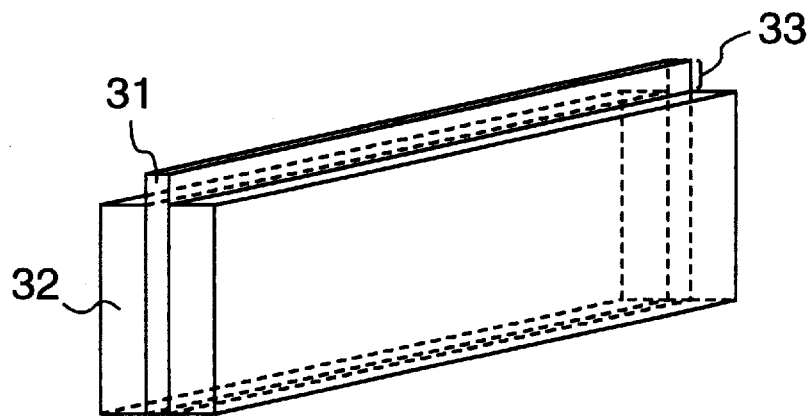
FIG. 3 is a perspective view of the electrode in Example.

92 parts by weight of commercial nickel particles and 8 parts by weight of cobalt oxide (CoO) particles were mixed. To the resulting mixture there was added an aqueous 2 wt. % carboxymethylcellulose solution to produce a paste. Each of the substrates obtained in Examples was pasted with the paste under pressure, followed by drying at 90° C. for one hour. The resulting electrodes were pressed to a thickness of 0.7 to 0.8 mm. The thus obtained electrodes were immersed in an aqueous dispersion of 2% by weight fluorinated resin. The resultant electrodes were cut to a width of 40 mm and a length of 250 mm and each electrode was spot welded with a lead plate at a predetermined position. The electrodes had a capacity of about 2900 mAh. In FIG. 3, an active material layer 32 is formed on both sides of the substrate 31. Here, a fiber-free portion 33 should be provided over one longitudinal edge of the electrode in order to spot weld the lead plate.

Figure 4:
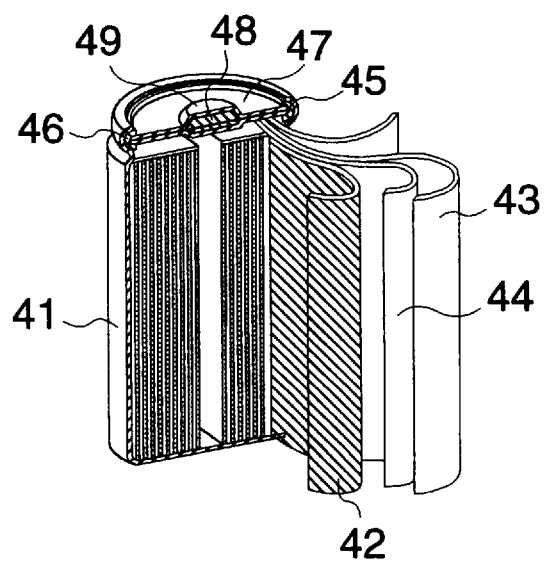
FIG. 4 is a schematic cross-sectional view of a partly broken and expanded structure of the battery using an embodiment of the electrode according to the present invention.

On the other hand, an exemplary negative electrode was made of a hydrogen occluded alloy. A MmNi$_5$ ally, i.e., MmNi$_{3.55}$Mn$_{0.4}$Al$_{0.3}$Co$_{0.75}$ was comminuted to a particle size of 53 μm or less and the alloy particles were immersed in an aqueous 31% KOH alkaline solution at 80° C. for one hour to activate the alloy particles while removing alkali-soluble components. To a sample of the resultant alloy particles there was added an aqueous 1.5% by weight CMC solution to produce a paste. A foamed nickel plate of a porosity of 95% and a thickness of 1.0 mm was pasted with the paste under pressure to prepare an electrode which was coated with a 5% fluorinated resin dispersion. The resulting electrode was cut into specimens having a width of 40 mm and a length of 295 mm and controlled to a thickness of 0.4 mm which were used as negative electrodes 43. The negative electrode 43 and one of the positive electrodes as described above 42 were rolled with a polypropylene non-woven fabric separator 44 which had been treated to be made hydrophilic being interposed therebetween and the resultant roll was encased in a cell case of a C size. Therefore, an electrolyte containing 30 grams/liter lithium hydroxide dissolved in an aqueous caustic potassium solution having a specific gravity of 1.30 was poured in the case and the opening of the case 41 was sealed with a seal plate 47 to complete a sealed nickel-hydrogen battery as shown in FIG. 4. In the FIG. 4, reference numbers 45, 46, 48 and 49 denote an insulating gasket, a positive collector, a safety valve and a cap, respectively. In this way the substrates a to h were incorporated in batteries A to H of the C type according to the present invention, respectively.

For comparison, a battery I was made in the same manner as in the above examples, except that no sintered fibrous nickel member was provided on the surface of the core material and a paste containing the active material was directly pasted on the core material and the resultant core was pressed to produce an electrode which was used.

The batteries A to I were subjected to formation and then evaluated for discharge characteristics. After charging at 0.2 CmA for 6 hours, the batteries were discharged at various discharge rate to a level of 1.0 V. The results are shown in Table 1.

TABLE 1

| Type of electrode | Discharge conditions | | Discharge capacity (discharge voltage) |
|---|---|---|---|
| | 0.2 C | 1.0 C | 3.0 C |
| Example A | 2.75Ah (1.25 V) | 2.52Ah (1.20 V) | 2.02Ah (1.15 V) |
| Example B | 2.84Ah (1.25 V) | 2.66Ah (1.20 V) | 2.13Ah (1.15 V) |
| Example C | 2.84Ah (1.25 V) | 2.66Ah (1.20 V) | 2.13Ah (1.15 V) |
| Example D | 2.80Ah (1.25 V) | 2.60Ah (1.20 V) | 2.08Ah (1.15 V) |
| Example E | 2.80Ah (1.25 V) | 2.60Ah (1.20 V) | 2.08Ah (1.15 V) |
| Example F | 2.80Ah (1.25 V) | 2.60Ah (1.20 V) | 2.08Ah (1.15 V) |
| Example G | 2.80Ah (1.25 V) | 2.60Ah (1.20 V) | 2.08Ah (1.15 V) |
| Example H | 2.80Ah (1.25 V) | 2.60Ah (1.20 V) | 2.08Ah (1.15 V) |
| Example I | 2.40Ah (1.20 V) | 2.04Ah (1.15 V) | 1.44Ah (1.05 V) |

The results in the above table indicate the improvement in utilization and discharge voltage in Examples A to H as compared with the comparative example I.

Next, three samples of each of the batteries A to H and I were subjected to a cycle life test where the samples were charged at 0.5 CmA for 3 hours at 20° C. until reaching to 60% of the initial capacity and then discharged at 1 CmA to 0.9 V. The results are shown in Table 2.

TABLE 2

| Type of electrode | Cycle number |
|---|---|
| Example A | 625, 630, 623 |
| Example B | 650, 662, 659 |
| Example C | 660, 655, 663 |
| Example D | 630, 635, 640 |
| Example E | 630, 625, 635 |
| Example F | 625, 630, 633 |
| Example G | 640, 630, 627 |
| Example H | 630, 635, 640 |
| Comparative Example I | 200, 193, 176 |

As can be seen from the results in Table 2 the batteries of Examples A to H had a much longer life then that of the comparative example I. Especially the batteries of Examples B and C had an exceptionally longer life due to further improvement in the tightness between the active material and the core material.

Although there have been described in Examples the case where the hydrogen occluded alloy was used for negative electrode, the present invention relates to the improvement of a pasted electrode (especially nickel electrode), and naturally can achieve the same effects even when a cadmium electrode is used as negative electrode as well as when an iron or zinc electrode is used.

As above, the use of an electrode comprising an electroconductive porous core material such as a punched metal sheet having sintered hollow filament or columnar nickel members formed thereon as a nickel substrate for alkaline batteries enables improvement in utilization and discharge characteristics of the nickel electrode as well as achievement of a longer life.

As described above, the present invention can provide a pasted electrode which is improved in the adhesiveness with an active material, utilization of the active material, discharge voltage characteristics, charge and discharge cycle life.

What is claimed is:

1. An electrode for alkaline storage batteries comprising an electroconductive core material selected from the group consisting of a perforated or non-perforated metal sheet or foil having at least two surfaces pasted with a paste containing an active material in combination with unitary sintered fibrous hollow nickel members on both said surfaces of the electroconductive core material pasted with said paste containing said active material, said unitary sintered fibrous nickel members being of about 2 to 4 mm in length and a majority of said nickel members being unitary sintered on said electroconductive core material in a perpendicular form.

2. The electrode for storage batteries according to claim 1, wherein said sintered fibrous nickel members have an amount of metal per unit area by weight of 300 to 800 grams/m$^2$.

3. The electrode for storage batteries according to claim 1, wherein the caliber of said fibrous hollow nickel members is larger than said active material and said sintered hollow fibrous nickel members are pasted with said active material even in the interiors thereof.

4. The electrode for storage batteries according to claim 1, wherein said electroconductive core material has a longitudinal edge which is free from the sintered fibrous nickel members for installing the lead.

5. A nickel electrode for alkaline storage batteries comprising a base material, selected from the group consisting of a perforated or non-perforated nickel or nickel-plated iron sheet or foil having at least two surfaces, having on both said surfaces unitary sintered a number of hollow fibrous nickel members of a length of 2 to 4 mm in an amount of material per unit area by weight of 300 to 800 grams/m$^2$ in a perpendicular form which have been integrated by sintering or heat-treating and a paste which is pasted on said base material and said number of hollow fibrous nickel members to be separately integrated therewith.

6. A process for producing the electrode of claim 1 for alkaline storage batteries having an electroconductive core material selected from the group consisting of a perforated of non-perforated metal sheet or foil pasted with a paste containing an active material, which comprises the steps of applying an adhesive to the electroconductive core material, implanting resin fibers on the adhesive coated electroconductive core material, pasting a paste produced by kneading nickel particles with a binder on the fiber-implanted electroconductive core material, drying the resulting composite, calcining the dried composite to thermally decompose out said resin fibers, adhesive and binder, and sintering the nickel particles at the interfaces therebetween and the electroconductive core material and the nickel particles at the interfaces therebetween.

7. A process for producing the electrode of claim 1 for alkaline storage batteries having an electroconductive core material selected from the group consisting of a perforated or non-perforated metal sheet or foil pasted with a paste containing an active material, which comprises the steps of kneading nickel particles with a binder, applying the resulting mixture to resin fibers, implanting the coated resin fibers on the electroconductive core material, pasting a paste produced by kneading nickel particles with a binder on the fiber-implanted electroconductive core material, drying the resulting composite, calcining the dried composite to thermally decompose out said resin fibers and binder, and sintering the nickel particles at the interfaces therebetween and the electroconductive core material and the nickel particles at the interfaces therebetween.

8. A process for producing the electrode of claim 1 for alkaline storage batteries having an electroconductive core material selected from the group consisting of a perforated or non-perforated metal sheet or foil pasted with a paste containing an active material, which comprises the steps of applying an adhesive to the electroconductive core material, implanting resin fibers on the adhesive coated electroconductive core material, heating said fiber-implanted core material in an atmosphere containing a nickel carbonyl gas at a temperature causing the decomposition thereof to form a nickel layer on the surfaces of said electroconductive core material and said adhesive, and sintering the nickel layer as well as the electroconductive core material and the nickel layer at the interfaces therebetween.

9. A process for producing the electrode of claim 1 for alkaline storage batteries having an electroconductive core material selected from the group consisting of a perforated or non-perforated metal sheet or foil pasted with a paste containing an active material, which comprises the steps of applying an adhesive to the electroconductive core material, implanting resin fibers on the adhesive coated electroconductive core material, forming a nickel layer on the surfaces of said fiber-implanted electroconductive core material and the resin fibers by vapor deposition, ion plating, or sputtering, thermally decomposing out said resin fibers and said adhesive, and sintering the nickel layer as well as the electroconductive core material and the nickel layer at the interfaces therebetween.

10. A process for producing the electrode of claim 1 for alkaline storage batteries having an electroconductive core material selected from the group consisting of a perforated or non-perforated metal sheet or foil pasted with a paste containing an active material, which comprises the steps of applying an adhesive to the electroconductive core material, implanting resin fibers on the adhesive coated electroconductive core material, forming a nickel layer on the surfaces of said fiber-implanted electroconductive core material and the resin fibers by chemical plating, thermally decomposing out said resin fibers and said adhesive, and sintering the nickel layer as well as the electroconductive core material and the nickel layer at the interfaces therebetween.

11. The process for producing an electrode for storage batteries according to claim 8, wherein after the step of a nickel layer on the surfaces of the electroconductive core material and the resin fibers, electrochemically nickel plating is further carried out.

12. The process for producing an electrode for storage batteries according to claim 6, wherein the step of implanting resin fibers on the electroconductive core material is performed by electrostatically implanting while charging positively the fibers with said electroconductive core material being grounded.

13. The process for producing an electrode for storage batteries according to claim 6, wherein said resin fibers do not have thermoplasticity.

14. The process for producing an electrode for storage batteries according to claim 6, wherein said resin fibers are monofilament or twisted yarn.

15. The process for producing an electrode for storage batteries according to claim 6, wherein said adhesive is applied to said electroconductive core material by spraying or roller transferring.

16. The process for producing an electrode for storage batteries according to claim 6, wherein the heating and sintering of the nickel particles at the interfaces therebetween and the electroconductive core material and the nickel particles at the interfaces therebetween is accomplished by electromagnetic heating.

17. The process for producing an electrode for storage batteries according to claim 6, wherein said adhesive is thermosetting.

18. The process for producing an electrode for storage batteries according to claim 6, wherein said binder is thermosetting.

19. The process for producing an electrode for storage batteries according to claim 6, wherein said electroconductive core material is subjected to an alternating magnetic field after pasting said paste produced by kneading nickel particles and a binder on said fiber implanted electroconductive core material, but prior to drying said paste.

20. The process for producing an electrode for storage batteries according to claim 9, wherein after the step of a nickel layer on the surfaces of the electroconductive core material and the resin fibers, electrochemically nickel plating is further carried out.

21. The process for producing an electrode for storage batteries according to claim 10, wherein after the step of a nickel layer on the surfaces of the electroconductive core material and the resin fibers, electrochemically nickel plating is further carried out.

22. The process for producing an electrode for storage batteries according to claim 7, wherein the step of implanting resin fibers on the electroconductive core material is performed by electrostatically implanting while charging positively the fibers with said electroconductive core material being grounded.

23. The process for producing an electrode for storage batteries according to claim 8, wherein the step of implanting resin fibers on the electroconductive core material is performed by electrostatically implanting while charging positively the fibers with said electroconductive core material being grounded.

24. The process for producing an electrode for storage batteries according to claim 9, wherein the step of implanting resin fibers on the electroconductive core material is performed by electrostatically implanting while charging positively the fibers with said electroconductive core material being grounded.

25. The process for producing an electrode for storage batteries according to claim 10, wherein the step of implanting resin fibers on the electroconductive core material is performed by electrostatically implanting while charging positively the fibers with said electroconductive core material being grounded.

26. The process for producing an electrode for storage batteries according to claim 7, wherein said resin fibers do not have thermoplasticity.

27. The process for producing an electrode for storage batteries according to claim 8, wherein said resin fibers do not have thermoplasticity.

28. The process for producing an electrode for storage batteries according to claim 9, wherein said resin fibers do not have thermoplasticity.

29. The process for producing an electrode for storage batteries according to claim 10, wherein said resin fibers do not have thermoplasticity.

30. The process for producing an electrode for storage batteries according to claim 7, wherein said resin fibers are monofilament or twisted yarn.

31. The process for producing an electrode for storage batteries according to claim 8, wherein said resin fibers are monofilament or twisted yarn.

32. The process for producing an electrode for storage batteries according to claim 9, wherein said resin fibers are monofilament or twisted yarn.

33. The process for producing an electrode for storage batteries according to claim 10, wherein said resin fibers are monofilament or twisted yarn.

34. The process for producing an electrode for storage batteries according to claim 7, wherein said adhesive is applied to said electroconductive core material by spraying or roller transferring.

35. The process for producing an electrode for storage batteries according to claim 8, wherein said adhesive is applied to said electroconductive core material by spraying or roller transferring.

36. The process for producing an electrode for storage batteries according to claim 9, wherein said adhesive is applied to said electroconductive core material by spraying or roller transferring.

37. The process for producing an electrode for storage batteries according to claim 10, wherein said adhesive is applied to said electroconductive core material by spraying or roller transferring.

38. The process for producing an electrode for storage batteries according to claim 7, wherein the heating and sintering of the nickel particles at the interfaces therebetween and the electroconductive core material and the nickel particles at the interfaces therebetween is accomplished by electromagnetic heating.

39. The process for producing an electrode for storage batteries according to claim 8, wherein said adhesive is thermosetting.

40. The process for producing an electrode for storage batteries according to claim 9, wherein said adhesive is thermosetting.

41. The process for producing an electrode for storage batteries according to claim 10, wherein said adhesive is thermosetting.

42. The process for producing an electrode for storage batteries according to claim 8, where said binder is thermosetting.

43. The process for producing an electrode for storage batteries according to claim 9, where said binder is thermosetting.

44. The process for producing an electrode for storage batteries according to claim 10, where said binder is thermosetting.

* * * * *